United States Patent [19]

Cairns et al.

[11] 3,931,933
[45] Jan. 13, 1976

[54] METHOD OF AND APPARATUS FOR THE POURING OF FAST FOAMING REACTANTS

[75] Inventors: John G. Cairns, McMurray; John L. McPherson, Bethel Park; James D. Orefice, Coraopolis, all of Pa.

[73] Assignee: Mobay Chemical Corporation, Pittsburgh, Pa.

[22] Filed: June 27, 1974

[21] Appl. No.: 483,585

[52] U.S. Cl. ............... 239/591; 138/140; 239/600; 285/16
[51] Int. Cl.² ............. B05B 15/02; F16L 57/00
[58] Field of Search ....... 239/1, 104, 106, 108, 591, 239/600, 602, DIG. 19; 252/188.3 R, 307; 285/16; 138/140, 147; 302/64

[56] References Cited
UNITED STATES PATENTS

| 2,392,408 | 1/1946 | Radonich | 239/1 |
| 2,953,248 | 9/1960 | Troland | 239/104 X |
| 3,143,147 | 8/1964 | Sellars et al. | 138/140 |
| 3,335,758 | 8/1967 | Bertolet, Jr. | 138/140 |
| 3,693,884 | 9/1972 | Snodgrass et al. | 239/591 |

FOREIGN PATENTS OR APPLICATIONS

| 682,673 | 5/1930 | France | 239/591 |

Primary Examiner—Evon C. Blunk
Assistant Examiner—Andres Kashinkow
Attorney, Agent, or Firm—Lawrence S. Pope

[57] ABSTRACT

A method and apparatus for the pouring of fast foaming reactants which essentially comprises the use of a disposable nozzle liner and a nozzle assembly adapted for use with such a disposable liner. The invention encompasses air flushing the nozzle assembly after each pouring cycle until the foam build-up on the nozzle liner becomes unacceptable. The liner is then replaced and operations are continued.

4 Claims, 5 Drawing Figures

METHOD OF AND APPARATUS FOR THE POURING OF FAST FOAMING REACTANTS

BACKGROUND OF THE INVENTION

In the commercial utilization of synthetic resin foams such as polyurethane foams, it is common to mix the reactants in a mixhead and then pass them through a nozzle into a mold having the shape of the desired end product or into a cavity which it is desired to fill with foam. The mixhead, nozzle and supply source are typically operated either as a higher pressure system at about 1000 psi or as a low pressure system at about 100 to 200 psi. After each pouring or mold filling cycle it is common to flush the nozzle. In the high pressure system this is commonly done with high pressure air (about 150 psig) alone but in the low pressure system a combination of an air flush and a solvent flush is typically employed. With many types of foam reactants these procedures have been adequate. Recently, however, very fast foam reactants have been introduced with which it is difficult to completely clear the nozzle or outlet by these flushing procedures. The air and solvent flush has had less difficulty than the air flush with these reactants but the use of solvent flushing is somewhat disfavored due to the short supply of solvent with the concurrent high cost and the safety hazards involved in solvent flushing. In fact, safety considerations preclude the use of solvent flushing in high pressure systems. In systems utilizing such reactants, it has been common to use a nozzle until it can no longer be adequately flushed. At this point, the entire nozzle assembly is removed, soaked overnight in a solvent and then cleaned with a wire brush. This procedure entails considerable labor and requires a stock of nozzle assemblies not otherwise needed.

The prior art, therefore, does not provide an easy safe and economical method of pouring very fast foaming reactants, nor does the art disclose a nozzle assembly especially adapted to the pouring of such reactants. There is no disclosure of how to use fast foaming reactants in a low pressure system without a solvent flush.

SUMMARY OF THE INVENTION

The present invention contemplates the use of a disposable liner disposed within the bore of a nozzle. The nozzle is assembled to a conventional mixhead and pouring proceeds in a normal manner until such time as the nozzle can no longer be adequately flushed. At this point, the nozzle assembly is disassembled, the used liner removed and replaced by a new one. The liners may be prepared in a very economical manner as will be explained hereinafter. The labor involved in exchanging an old or used liner for a new liner is minimal. Thus, the present invention provides a fast, safe and economical manner in which to pour fast foaming reactants and provides a nozzle assembly which allows the economical pouring of such reactants.

A BRIEF DESCRIPTION OF THE DRAWINGS

A DESCRIPTION OF THE PREFERRED EMBODIMENTS

Figure 1:
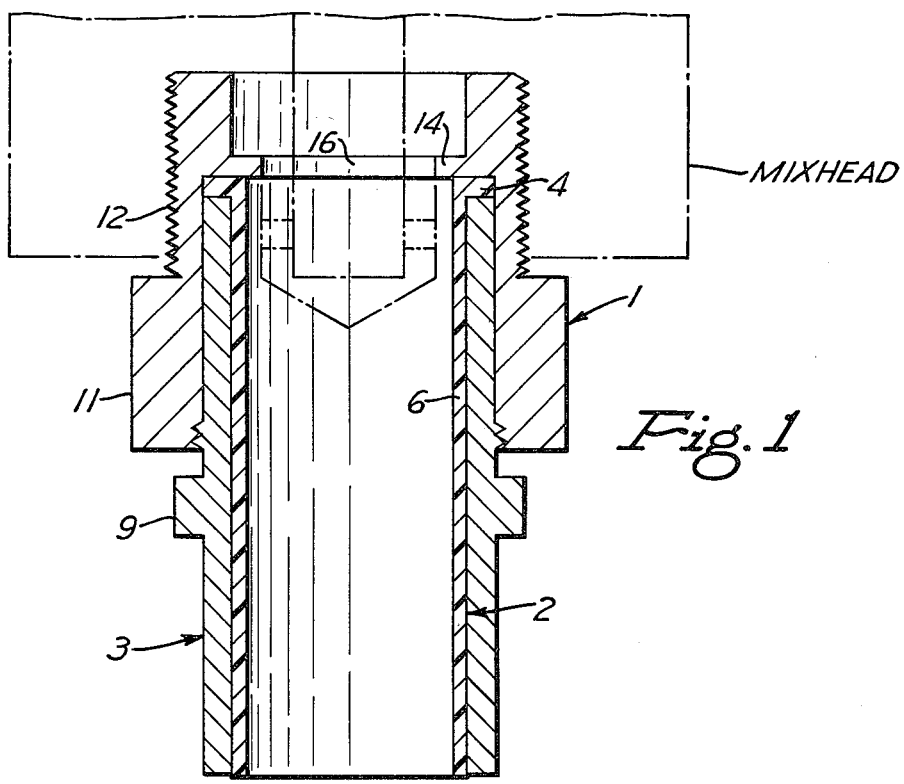
FIG. 1 shows a longitudinal cross-section of the nozzle assemblage affixed to a mixhead shown in phantom lines.

In FIG. 1 there is shown a nozzle housing 1 with a nozzle 3 attached thereto. Disposed within the bore of the nozzle 3 is a disposable liner 2. It is this liner that allows the use of this nozzle assemblage in an economical manner with fast foaming reactants. Some foams now in commercial use are made with reactants which begin to foam in a very short time. For example, some low density rigid foams have creaming times of 6 to 7 seconds. The cream time is the period of time from the mixing of the reactants until a visual change in the mixture (the color of the liquid) occurs and is a commonly used industry measure of the time for initiation of the foaming reaction. A particular reactant system having such a short reactant creaming time is that system utilizing diisocyanate prepolymer and polyether polyol reactants. The present invention has been used to advantage with such a reactant system.

In normal operation, the liquid reactants are mixed and provided to the nozzle at some positive pressure for each pouring operation. After each pouring operation the nozzle is flushed. In the high pressure system air at about 150 psig is used. In the low pressure system succcessive solvent and air flushes may be used although it is preferred not to use a solvent flush for health and economy reasons. Eventually, foam will build up in the nozzle liner thereby decreasing its internal diameter. The feed pressure and flow rate are normally controlled by valving devices which allow the reactants to flow from the feed lines to the mixhead once the pressure in the feed lines reaches a preset value. However, additional flow resistance downstream at the nozzle due to foam build up will cause the flow rate to decrease and the pressure in the supply lines to increase. The pressure increase is more noticeable in the high pressure system while the decrease in flow rate is more noticeable in the low pressure system. For example, a typical high pressure system operates at about 1000 psig and about a 10% increase in pressure signal that it is time to change the nozzle liner before the additional back pressure begins to interfere with the normal operation of the mixhead.

Figure 2:
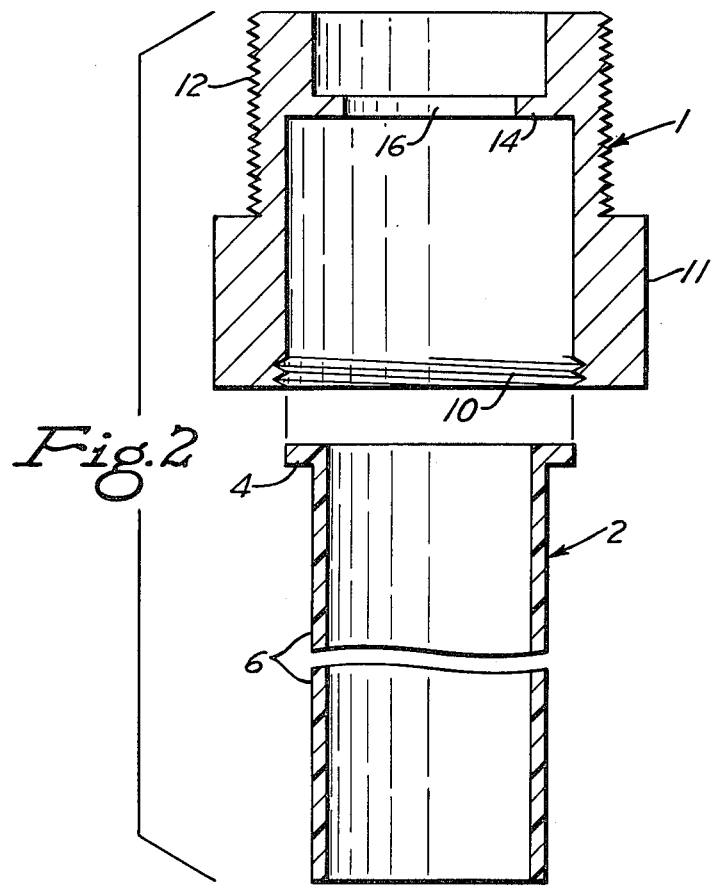
FIG. 2 shows a longitudinal cross-section of the nozzle housing and the nozzle liner.
Figure 3:
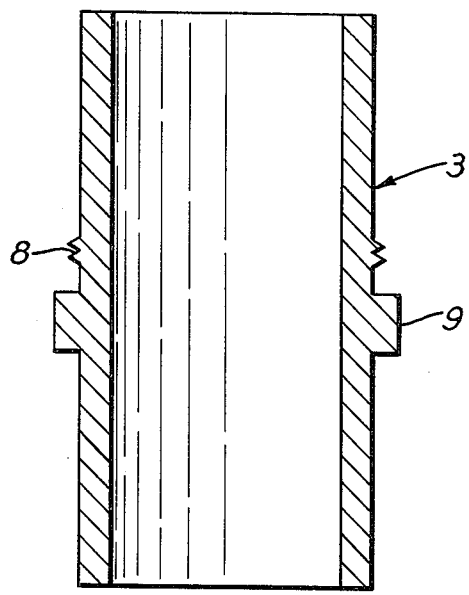
FIG. 3 shows a longitudinal cross-section of the nozzle itself.

FIG. 2 shows the nozzle liner and the nozzle housing with which it is adapted to mate. The nozzle liner 2 has a simple right cylinder body 6 with a flange portion 4 on one of its terminal ends. The nozzle housing 1 is provided with a transverse wall 14 which has a centrally located aperture 16. The flange 4 of the nozzle liner 2 is adapted to be seated against this transverse wall 14. The nozzle housing is provided with exterior threads 12 which are adapted to mate with threads in the mixhead (not shown in this Figure). The nozzle housing also has interior threads 10 which are adapted to mate with threads 8 provided on the nozzle 3 (see FIG. 3). Gripping surfaces 11 are provided on the nozzle housing in order to facilitate threading of the nozzle housing in and out of the mixhead. FIG. 3 is a cross-section of the nozzle itself and it is basically a right cylinder provided with exterior threads 8 for mating with the internal nozzle housing threads 10. It is provided with gripping surfaces 9 to facilitate the threading of the nozzle into and out of the nozzle housing.

The nozzle and nozzle housing may be constructed of any common constructional material, for example, SAE-1020 steel. It is preferred that the nozzle and nozzle housing be constructed out of materials which are readily machinable. The nozzle liner may also be formed of any readily available constructional material. However, it is preferred to use a material which is relatively cheap and easily disposed of. Furthermore, it is preferred to use materials which are resistant to bonding with the foaming chemicals. Synthetic resins such as polyethylene, polyvinyl chloride, teflon and polypropylene are believed to be quite suitable for this application. It is also believed to be advantageous for the inner wall or bore of the nozzle liner to have a smooth surface. Teflon is the most chemically resistant to bonding with most foaming reactants such as those used to produce polyurethane. However, it is not the most preferred material because it must be machined to shape and as the result of this machining its inner surface will be somewhat rough. The most preferable material having the best balance of chemical resistance to bonding and providing the smoothest inner surface has been found to be polypropylene. The nozzle liners may be prepared by any convenient conventional forming method such as, machining, or in the case of the resins, cast molding; or the cutting to length and upsetting of extruded tube. It is advantageous if the material used for the flange nozzle liner be somewhat compressible. This is desirable because it is important that a gasket type seal be formed between the nozzle and nozzle housing at the point where the upper end of the nozzle abuts the flange 4 of the nozzle liner which in turn abuts the wall 14 of the nozzle housing. If a gasket type seal is not formed at this juncture, it is believed that foaming chemicals could leak around onto the wall 14 resulting in a bond between the nozzle liner and the nozzle housing and thereby creating difficulties in removing the nozzle liner.

Figure 4:
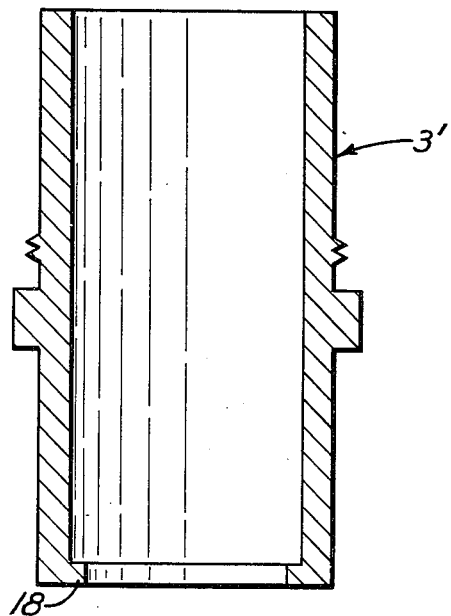
FIG. 4 shows the longitudinal cross-section of an alternative embodiment of the nozzle.
Figure 5:
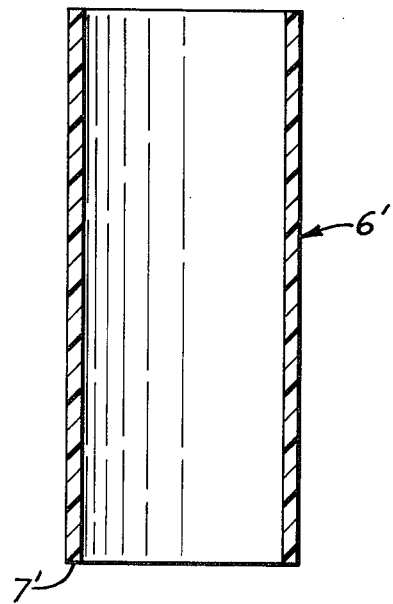
FIG. 5 shows a longitudinal cross-section of an alternative embodiment of the nozzle liner.

FIG. 4 shows an alternative embodiment of the nozzle 3'. In this embodiment an inwardly directed flange 18 has been added to the lower edge of the nozzle. This alternative nozzle 3' is adapted for use with the alternative nozzle liner 6' shown in FIG. 5. This nozzle liner 6' has no flange and is simply a straight right cylinder. One of the advantages of this embodiment is that a great number of nozzle liners may simply be prepared by cutting suitable lengths from a long length of extruded pipe of, for instance, polypropylene resin. In this embodiment it has been found advantageous to insure that the lower edge of the nozzle liner 7' is at right angle to the axis of the nozzle liner. This will insure a good mating between this edge 7' and the ledge 18 provided on the nozzle so that a sealing relationship can be developed. If there are any gaps or discontinuities between the edge 7' and the ledge 18 foaming reactants may penetrate the joint and bond the nozzle liner to the nozzle. In order to retain the proper degree of squareness of the edge 7' it has been found advantageous to cut off lengths of nozzle liner on a turret lathe.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as it may be limited by the claims.

What is claimed is:

1. A nozzle assembly for use with fast forming reactants comprising:

a generally tubular nozzle having a smooth internal bore and having a connecting means on its external surface, a generally tubular nozzle housing having a connecting means on a portion of its exterior surface adapted to engage a mixhead and having a first internal bore separated from a second internal bore by a traverse wall having a centrally located aperture, said first bore containing a portion of said nozzle and having connecting means in engagement with the connecting means of said nozzle and said second bore being adapted to mate with said mixhead, and a disposable nozzle liner disposed within the bore of said nozzle having a generally smooth internal bore and a radially outwardly directed annular flange disposed between the traverse wall of said nozzle housing and the end of said nozzle disposed within said nozzle housing and forming a sealing relationship with said nozzle and said traverse wall.

2. A nozzle assembly for use with fast forming reactants comprising:

a generally tubular nozzle having a smooth internal bore, a radially inwardly directed annular flange disposed at one end of the nozzle and a means for connecting on a portion of its external surface, a generally tubular nozzle housing having connecting means on a portion of its exterior adapted to engage a mixhead and having a first internal bore separated from a second internal bore by a traverse wall with a centrally located aperture, said first bore containing a portion of said nozzle terminating in the end not having said flange and having connecting means in engagement with the connecting means on the exterior of said nozzle and said second bore being adapted to mate with a portion of said mixhead, and a disposable nozzle liner having a generally tubular body and a smooth internal bore and being disposed within the bore of said nozzle between the traverse wall of said nozzle housing and the annular flange of said nozzle and forming a sealing relationship with said flange.

3. A nozzle assembly for use with fast foaming reactants comprising:

a generally tubular nozzle having a smooth internal bore and having male threads on a portion of its external surface, a generally tubular nozzle housing having male threads on that portion of its exterior adapted to engage a mixhead and having a first internal bore separated from a second internal bore by a transverse wall having a centrally located aperture, said first bore containing a portion of said nozzle and having female threads in engagement with the male threads of said nozzle and said second bore being adapted to mate with said mixhead and being surrounded by said male nozzle housing threads, and a disposable nozzle liner disposed within the bore of said nozzle having a generally tubular body, a smooth internal bore and a radially outwardly directed annular flange disposed between the transverse wall of said nozzle housing and the end of said nozzle disposed within said nozzle housing and forming a sealing relationship with said nozzle end and said transverse wall.

4. A nozzle assembly for use with fast foaming reactants comprising:

a generally tubular nozzle having a smooth internal bore, a radially inwardly directed annular flange disposed at one end of the nozzle and male threads on a portion of its external surface, a generally tubular nozzle housing having male threads on that portion of its exterior adapted to engage a mixhead and having a first internal bore separated from a second internal bore by a transverse wall with a centrally located aperture, said first bore containing the portion of said nozzle terminating in the end not having said flange and having female threads in engagement with the male threads of said nozzle and said second bore being adapted to mate with a portion of said mixhead and being surrounded by said male nozzle housing threads, and a disposable nozzle liner having a generally tubular body and a smooth internal bore and being disposed within the bore of said nozzle between the transverse wall of said nozzle housing and the annular flange of said nozzle and forming a sealing relationship with said flange.

* * * * *